United States Patent
Ballantyne

(10) Patent No.: US 6,357,953 B1
(45) Date of Patent: Mar. 19, 2002

(54) TOLERANCE COMPENSATION APPARATUS

(75) Inventor: David Burgess Ballantyne, Bloomfield Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/464,106

(22) Filed: Dec. 16, 1999

(51) Int. Cl.[7] ................................................ F16G 11/12
(52) U.S. Cl. ........................ 403/43; 411/383; 403/47; 403/365; 403/372
(58) Field of Search .............................. 403/43, 47, 48, 403/372, 365, 343; 411/304, 302, 383, 384

(56) References Cited

U.S. PATENT DOCUMENTS

| | | | |
|---|---|---|---|
| 1,893,067 A | * | 1/1933 | Arenz |
| 4,453,346 A | | 6/1984 | Powell et al. ................. 49/404 |
| 4,682,906 A | * | 7/1987 | Ruckert et al. |
| 5,288,191 A | * | 2/1994 | Ruckert |
| 5,340,258 A | * | 8/1994 | Simon |
| 5,492,388 A | | 2/1996 | Kawasaki .................... 296/194 |
| 5,697,592 A | | 12/1997 | Matheny et al. ........ 238/231.91 |

FOREIGN PATENT DOCUMENTS

| | | | |
|---|---|---|---|
| DE | 610 990 | * | 5/1979 |
| FR | 2 609 761 | * | 1/1987 |

* cited by examiner

Primary Examiner—Lynne H. Browne
Assistant Examiner—Tomlyne A Malcolm
(74) Attorney, Agent, or Firm—Laura C. Hargitt

(57) ABSTRACT

A tolerance compensator provides a predetermined tolerance or space between connected assembly members. The tolerance compensator has a pair of connector components a first of which is secured to one of the assembly members and the second connector component is threadably installed, with a left hand thread, into the first connector component. A threaded fastener, with a right hand thread, is inserted into the connector components to initially engage the second connector component, either threadably or frictionally, to cause relative rotation between the first and second components whereby the second component advances toward and engages the second assembly member. The threaded fastener also threadably engages the first connector component to provide a secure connection between assembly members with the designed tolerance or space therebetween.

2 Claims, 4 Drawing Sheets

TOLERANCE COMPENSATION APPARATUS

TECHNICAL FIELD

This invention relates to apparatus that will automatically take-up the tolerance or predetermined spacing between adjacent components.

BACKGROUND OF THE INVENTION

In many assemblies, it is necessary to maintain a space or tolerance between adjacent components of the assembly. These components must be joined with a solid and secure joint while maintaining the required space between the components. For example, the instrument panel assembly, in an automobile, is positioned between the body hinge pillar posts. The door hinges are secured to the pillar post. It is important to maintain the design space between the panel and the post while rigidly attaching the panel to the post for support.

Many mounting systems have been proposed to control the tolerance between the joined adjacent components. The simplest of these systems provides for a spacer to be positioned between the components in surrounding relation with the fastener that secures the components together. While simple and effective, these systems can be difficult to install in many situations and often add assembly time to the product. Other devices, often termed "automatic compensators" have evolved. These devices generally include a plethora of parts and may require two or more tools to complete the installation or preadjustment. For example, the spacer control mechanisms shown in U.S. Pat. Nos. 5,288,191; 5,492,388; 5,697,592; 5,340,258 and 4,453,346. Still others involve the use of mating cam structures that have one cam member driven in unison with the fastener and the mating cam structure held stationary with one of the components to be spaced as described in U.S. Pat. No. 4,682,906.

SUMMARY OF THE INVENTION

It is an object of the present invention to provide an improved automatic compensator.

In one aspect of the present invention a turning member is threadably engaged in one of the components with a turning sense or "hand" opposite to the turning sense of the fasteners that secures the components together. In another aspect of the present invention, the turning component has a left hand thread and the fastener has a right hand thread.

In yet another aspect of the present invention, a driver element is positioned to be engaged by the fastener to initiate rotation of the turning element in response to the turning of the fastener. In still another aspect of the present invention, the turning element advances from the one component to engage the other component in response to the rotation of the turning element as induced by the driver element.

In yet still another aspect of the present invention, the driver element or portion is integral with the turning element. In a further aspect of the present invention, the driver element is separate member threadably engaging the fastener and frictionally engaging the turning element. In a yet further aspect of the present invention, the driver element requires a turning torque greater than the turning torque required to rotate the turning element relative to the one component. In a still further aspect of the present invention, the fastener threadably engages both the driver element and the one component.

DESCRIPTION OF THE EXEMPLARY EMBODIMENTS

Figure 1:
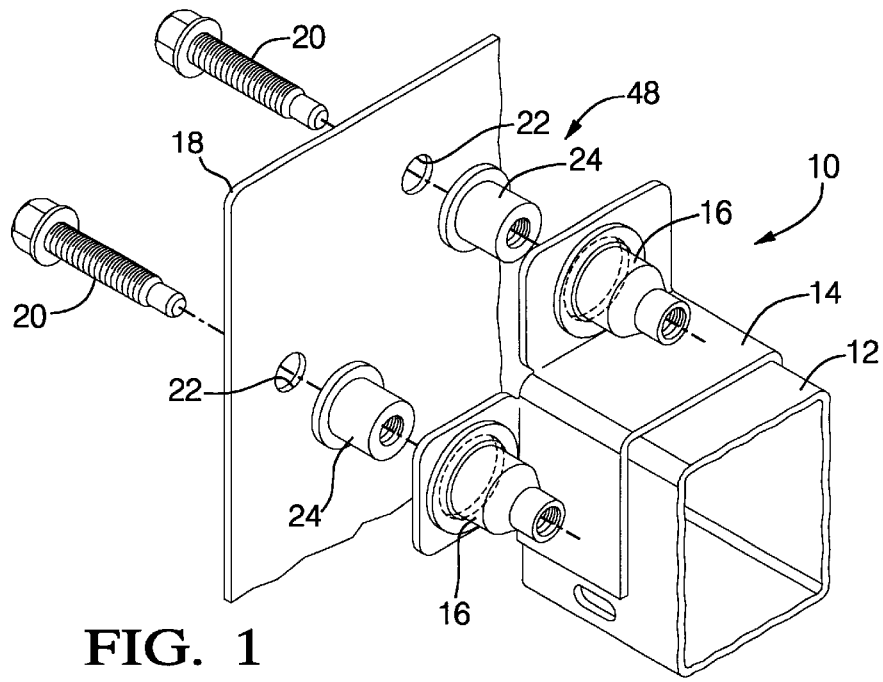
FIG. 1 is an isometric view of a structure incorporating the present invention.
Figure 2:
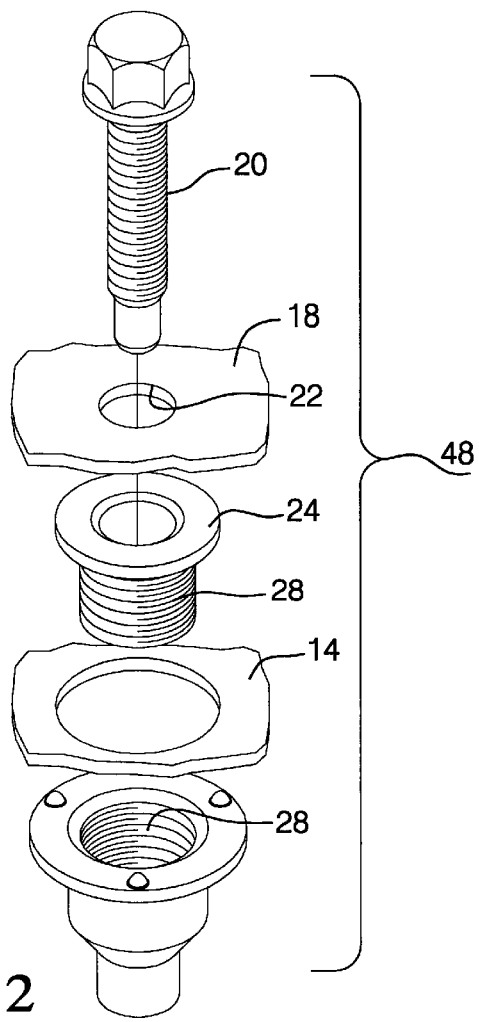
FIG. 2 is an exploded view of an assembly incorporating the present invention

An assembly 10, shown in FIGS. 1 and 2, has a pillar 12 with a bracket 14 secured thereto. The bracket 14 has a pair of connector components 16 welded thereon. A panel 18 is spaced from the pillar 12 and bracket 14. Fasteners 20 pass through openings 22, formed in the panel 18 and are threadably engaged in the connector component 16. Another connector component 24 is held in abutment with the panel 18. The connector component 16 has a internally threaded bore 26. The threaded bore 26 is a left hand helix. The connector component 24 has an externally threaded surface 28 which is also a left hand helix.

Figure 3:
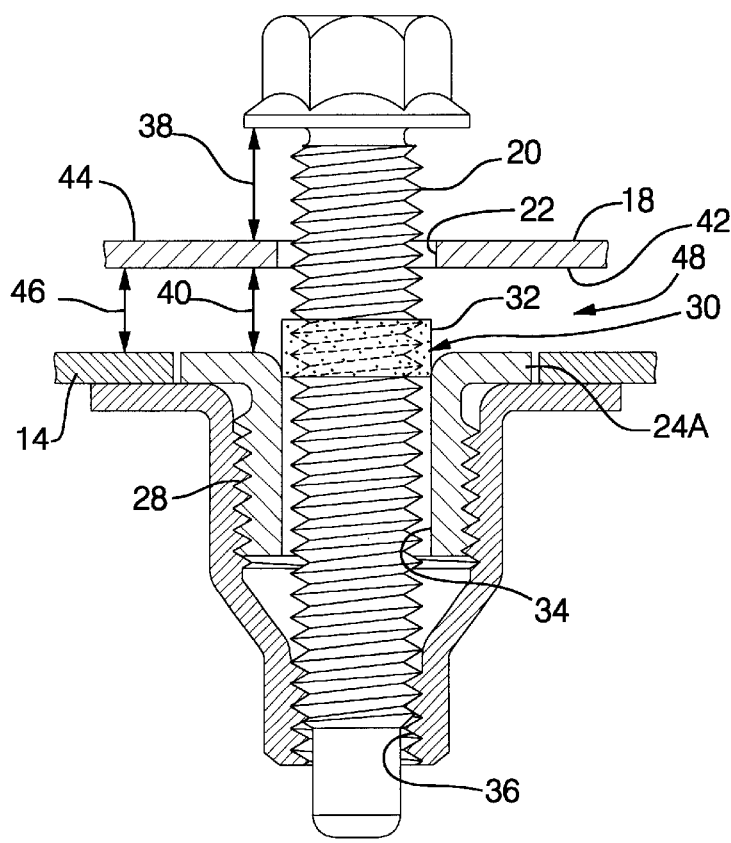
FIG. 3 is a sectional elevational view of one embodiment of the present invention.
Figure 4:
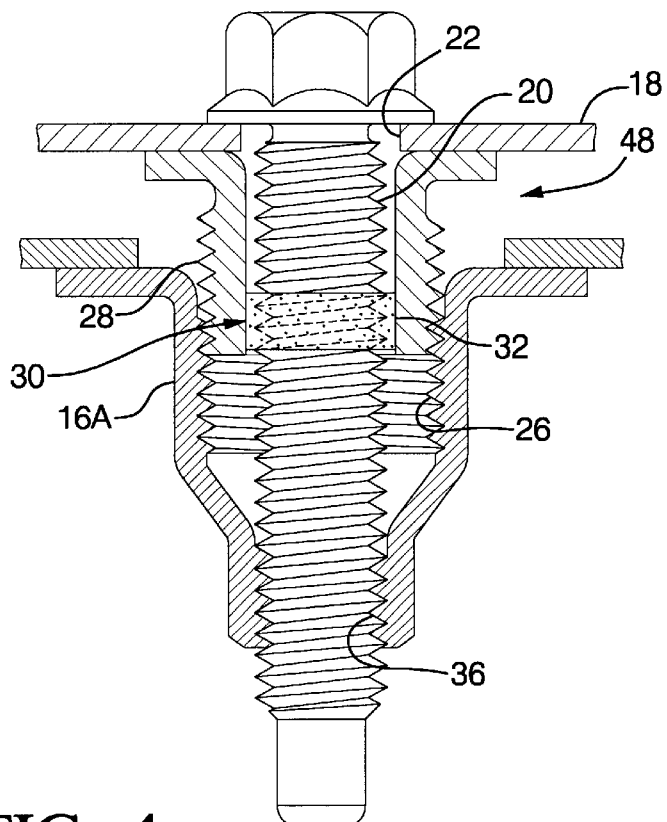
FIG. 4 is a sectional elevational view of the embodiment shown in FIG. 3 fully assembled.

As best seen in the embodiment depicted in FIGS. 3 and 4, the threaded fastener 20 has a plastic ring 30, (i.e. nylon), bonded thereto. The ring 30 has a outer diameter 32 which in FIG. 3 is aligned with an inner bore 34 of the connector component 24A. The outer diameter 32 is larger than the diameter of the bore 34 such that a slight interference fit will occur when the ring 30 is positioned in the bore 34 as shown in FIG. 4.

The connector component 16A has a threaded bore 36 which has the same thread size as the fastener 20. Both the threaded bore 36 and the fastener 20 have threads with a right hand helix. As the fastener 20 is inserted through both the opening 22 and the connector component 24A and into the connector component 16A, the thread on the fastener 20 will engage the threaded bore 36 prior to the ring 30 entering the bore 34. This relieves the operator of exerting an axial force on the fastener 20 to initiate insertion of the ring 30 into the bore 34. The mechanical advantage of the threads will perform this task without undue exertion by the operator.

As the ring 30 is drawn into the bore 34, a turning moment will be applied to the connector component 24A in the right hand direction. The turning moment applied is greater than the resisting moment holding the connector component 24A in position. This results in the connector component 24A being unthreaded from the connector component 16A such that the connector component 24A will advance axially toward the panel 18. When the plastic ring 30 initially engages the bore 34, the distance 38 between the fastener 20 and the panel 18 is greater than the distance 40 between the connector component 24A and the panel 18. Thus, the connector component 24A will abut the lower surface 42 of the panel 18 prior to the fastener 20 abutting the upper surface 44 of the panel 18. When the connector component 24A abuts the panel 18, the resulting friction will be greater than the resistance of the ring 30 entering the bore 34 such that the connector component 24A will be held against the surface 42. When the fastener 20 abuts the upper surface 44 as shown in FIG. 4, the space 46, between the panel 18 and the bracket 14, will be equal to the design tolerance between the panel 18 and the bracket 14.

The simplicity of the automatic tolerance compensator (ATC) 48 comprised of the fastener 20 and the connector components 24A and 16A will now be apparent to those skill in the art. It is possible to incorporate the connector component 16 directly into the bracket 14 by using an extrusion process at the time of manufacture of the bracket 14. However, it is considered that the welding operation will require less tooling an therefore less manufacturing cost. The bracket 14 and panel 18 are only shown by way of example to create an environment in which the ATC 48 can be used. The ATC 48 can be utilized in essentially any assembly where a required design tolerance is need between joined parts. The ATC 48 is particularly useful where the assembly of the joined part involves a blind operation wherein at least one of the parts is not accessible to the operator.

Figure 5:
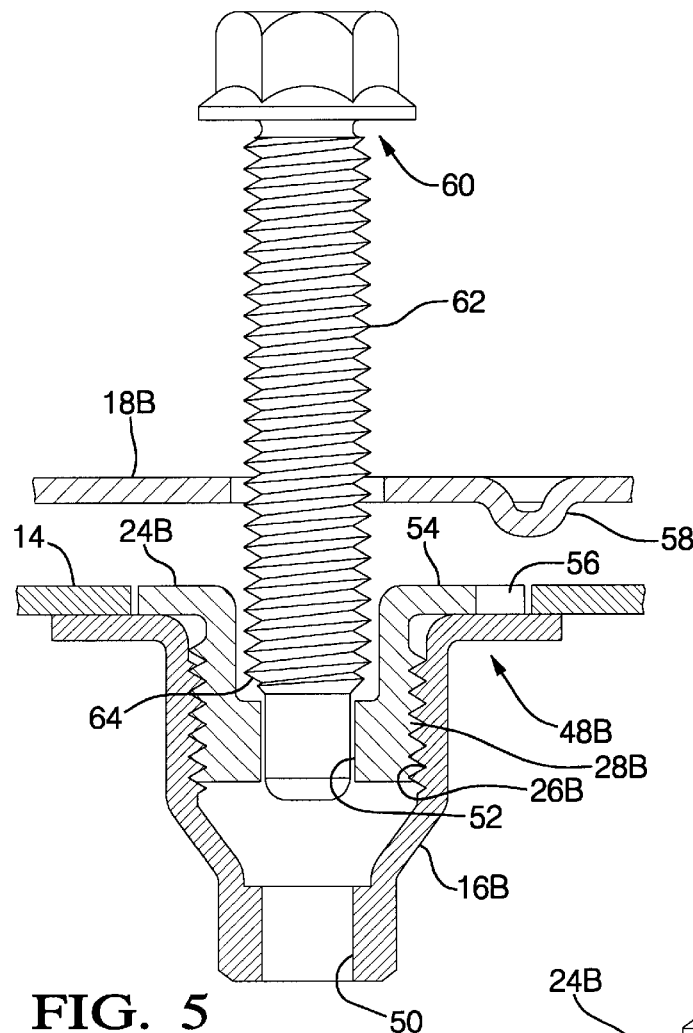
FIG. 5 is a sectional elevational view of another embodiment of the present invention.
Figure 6:
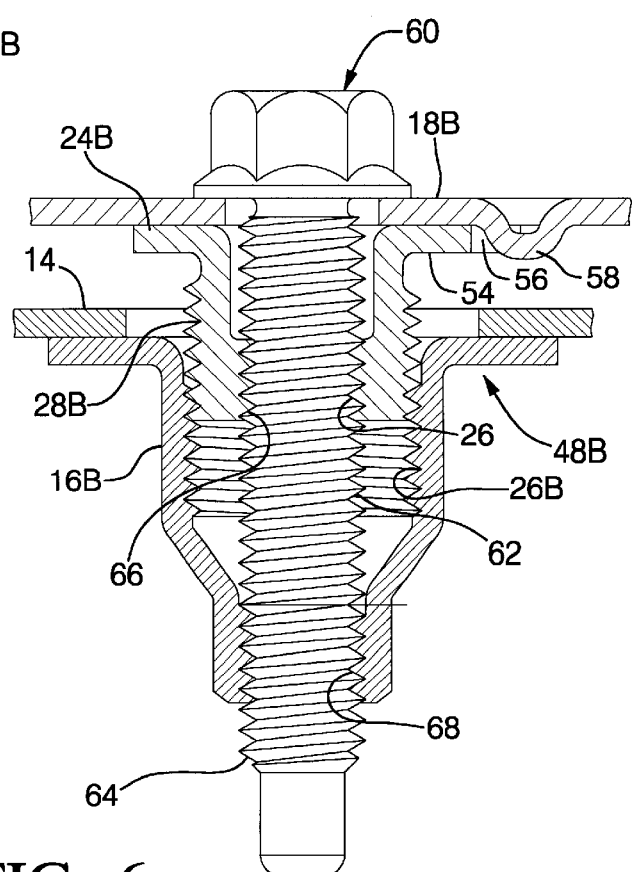
FIG. 6 is a sectional elevational view of the embodiment shown in FIG. 5 fully assembled.

The ATC 48B, depicted in FIGS. 5 and 6, has connector components 16B and 24B. The connector component 16B is welded or otherwise secured with the bracket 14. The connector component 16B has a left hand threaded surface 26B and an unthreaded bore 50 as shown in FIG. 5. The connector component 24B is threadably engaged through an external threaded surface 28B with the thread surface 26B in the connector component 16B. The connector component 24B has an unthreaded bore portion 52 as shown in FIG. 5. The connector component 24B has a flange 54 on which is formed a tab 56. The panel 18B has a protuberance 58 formed by displacing metal from the surface thereof.

A fastener 60 has a right hand thread 62 formed thereon. The thread 62 includes a thread forming or cutting portion 64. When the fastener 60 is inserted in the bore 52 and rotated, a right hand thread 66 is formed therein (see FIG. 6). The forming of the thread 66 in the connector component 24B induces a torque on the connector component 24B which is effective to unthread the connector component 24B from the connector component 16B resulting in axial translation toward the panel 18B. When the tab 56 abuts the protuberance 58, rotation and translation of the connector component 24B will cease and the fastener 60 will progress toward the bore 50 in the connector component 16B. The thread cutting or forming portion 64 will form a thread 68 in the bore 50. Since a new thread is processed in the bore 50 there is no concern as to the threads of bores 52 and 50 having a common helix. When the fastener 60 abuts the panel 18, the bracket 14 will be spaced therefrom at the desired design tolerance.

Figure 7:
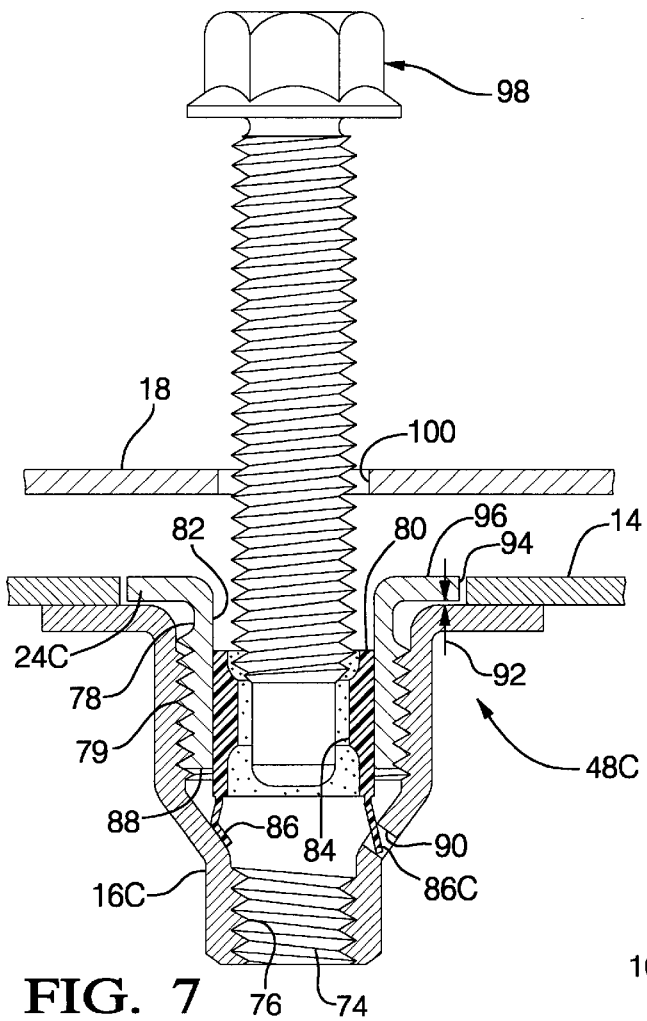
FIG. 7 is a sectional elevational view of one embodiment of the present invention.
Figure 8:
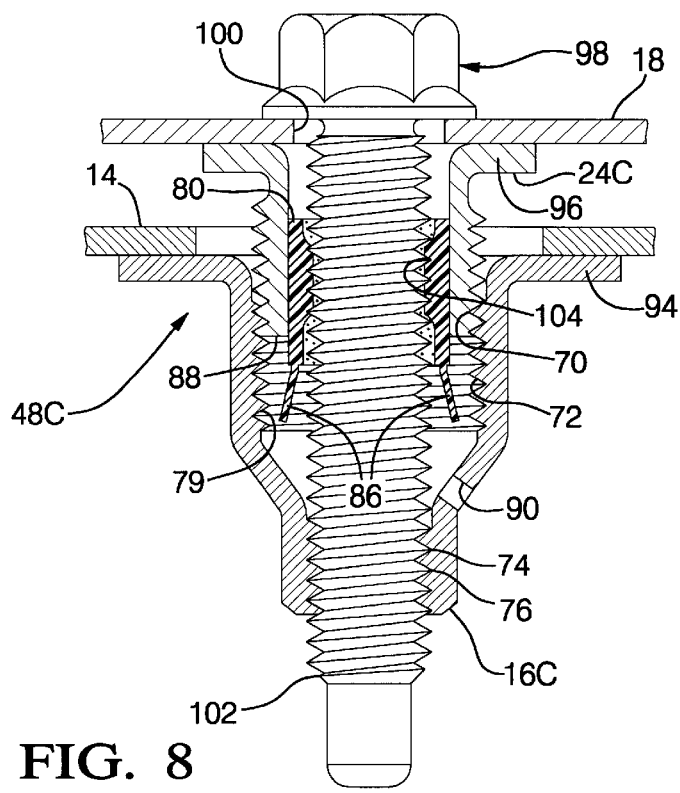
FIG. 8 is a sectional elevational view of the embodiment shown in FIG. 7 fully assembled.

The ATC 48C, depicted in FIGS. 7 and 8, has a pair of connector components 16C and 24C. The connector component 16C has a internally threaded surface 70 with a left hand thread 72 and a smaller internally threaded surface 74 with a right hand thread 76. The connector component 24C has a externally threaded surface 78 with a left hand thread 79 that is threadably engaged with the internally threaded surface 70 as shown in FIG. 7.

A plastic insert 80 is securely attached to an inner bore surface 82 of the connector component 24C. The insert 80 has a smooth inner bore 84 when installed in the bore 82. The insert 80 has a plurality of extensions or fingers 86, that extend beyond the end 88 of the connector component 24C. One of the fingers 86C is disposed in an opening 90 formed in the connector component 16C.

The described embodiment 48C has four fingers 86. The finger 86C maintains the connector component 24C in loose engagement with the connector component 16C such that a small gap 92 is present between a flange 94 on the connector component 16C and a flange 96 on the connector component 24C. The finger 84C prevents disengagement of the connector component 24C from the connector component 16C during shipping and handling prior to final assembly of the panel 18 to the bracket 14.

During assembly of the panel 18 to the bracket 14, a threaded fastener 98 is inserted through an opening 100 in the panel 18 and into the plastic insert 80. The fastener 98 has a leading edge 102 which provide a thread forming structure. A partial thread 104, (approximately five to ten percent of a full thread) is formed in the insert 80 by the threaded fastener 98 as the fastener is driven into the insert 80. The torque reaction to the thread forming in the insert 80 results in the connector component 24C unthreading from the connector component 16C. The insert 80 will translate along the fastener 98 until the flange 96 is abutting the panel 18. The fastener then enters the threaded surface 74. The helix of the threaded surface 74 and the partial thread 104 do not have to be aligned. The partial thread 104 is stripped from the insert 80.

The ATC 48C establishes the desired space or tolerance between the bracket 14 and the panel 18. The bracket 14 and the panel 18 are merely examples of two components that can be assembled with a design space therebetween. Many other assemblies will benefit from the ATC's of the present invention.

What is claimed is:

1. An automatic tolerance compensator for connecting first and second members with a space therebetween, said automatic tolerance compensator comprising:

a threaded fastener having a first thread directional sense;

a first connector component including a first threaded surface having a second thread directional sense, a second surface extending axially relative to said fastener and adapted to receive said threaded fastener in engagement therewith, said first connector component being secured with the first member;

a second connector component including a third threaded surface having the second thread directional sense and being threadably engaged with said first threaded surface;

means for operatively connecting said threaded fastener with said second connector component to enforce unthreading of said second connector component from said first connector component when said threaded fastener is rotated in said first thread directional sense until said second connector component abuts the second member, said threaded fastener threadably engaging said first connector component to thereby control the spacing of the first and second members; and said operative connecting means comprising a plastic member bonded to said threaded fastener and a bore in said second connector component aligned with and frictionally engaged by said plastic member to impose a torque on said second connector component to enforce unthreading of said connector component from said first connector component to thereby axially translate said second connector component into abutment with said second member.

2. The automatic tolerance compensator defined in claim 1 further comprising:

said first connector having another threaded surface formed on said second surface and having the first thread directional sense and being threadably engageable with said threaded fastener; and said second connector component has sufficient axial length to fill the space between said first and second members and remain threadably engaged with said first connector component.

\* \* \* \* \*